US008039081B2

(12) United States Patent
Ianniello et al.

(10) Patent No.: US 8,039,081 B2
(45) Date of Patent: *Oct. 18, 2011

(54) FUZZY WOVEN LAYERS, GEOCOMPOSITE LAMINATES INCORPORATING THEM, AND RELATED METHODS

(75) Inventors: Peter J. Ianniello, Havre de Grace, MD (US); Giovanni Capra, Ellicott City, MD (US)

(73) Assignee: Peter J. Ianniello, Havre de Grace, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/366,692

(22) Filed: Feb. 14, 2003

(65) Prior Publication Data

US 2003/0224143 A1 Dec. 4, 2003

Related U.S. Application Data

(60) Provisional application No. 60/356,112, filed on Feb. 14, 2002.

(51) Int. Cl.
*B32B 3/06* (2006.01)
*B32B 3/10* (2006.01)
*B32B 7/04* (2006.01)
*B32B 37/04* (2006.01)

(52) U.S. Cl. ......... 428/86; 428/99; 428/137; 156/324.4; 405/302.7

(58) Field of Classification Search .................... 428/86, 428/99, 100, 85, 92, 131, 137; 156/324, 156/324.4; 442/35, 36, 268, 270, 286; 405/36, 405/302.4, 302.7
See application file for complete search history.

(56) References Cited

U.S. PATENT DOCUMENTS

| 4,815,892 | A | * | 3/1989 | Martin | 405/45 |
| 5,755,016 | A | * | 5/1998 | Provost | 24/452 |
| 5,891,549 | A |   | 4/1999 | Beretta | |
| 6,505,996 | B1 | * | 1/2003 | Ianniello et al. | 405/36 |
| 7,488,523 | B1 | * | 2/2009 | Muncaster et al. | 428/40.1 |
| 7,584,581 | B2 | * | 9/2009 | Iske | 52/380 |
| 2002/0044842 | A1 | * | 4/2002 | Ianniello et al. | 405/302.7 |
| 2003/0178122 | A1 | * | 9/2003 | Ianniello et al. | 156/71 |
| 2003/0224143 | A1 | * | 12/2003 | Ianniello et al. | 428/137 |
| 2007/0183852 | A1 | * | 8/2007 | Beretta | 405/302.7 |
| 2009/0159177 | A1 | * | 6/2009 | Muncaster et al. | 156/71 |

* cited by examiner

*Primary Examiner* — Cheryl Juska
(74) *Attorney, Agent, or Firm* — The Nath Law Group; Jerald L. Meyer; Jiaxiao Zhang

(57) ABSTRACT

Void-maintaining laminates comprising fuzzy woven or fuzzy membrane layers are provided. Laminates of the present invention comprise at least one sheet-like core element, typically comprising void spaces or channels and, bonded thereto, at least one layer of fuzzy woven composite for use in geotechnical applications. The superior adhesion or bonding of the respective layers to one another, and its contribution to the structural integrity of void spaces or channels, enables the construction and positioning of drainage composites having the desirable characteristics of high permittivity and high transmissivity. Numerous embodiments of the invention are possible. Fuzzy geocomposites of the invention can be used, for example, underneath buildings, foundations, roadways and other paved structures, or in landfills or other types of geotechnical installations to replace or complement conventional drainage materials such as sand, stone and gravel. Methods for making the fuzzy geocomposites are also provided.

35 Claims, No Drawings

FUZZY WOVEN LAYERS, GEOCOMPOSITE LAMINATES INCORPORATING THEM, AND RELATED METHODS

The present application claims priority to U.S. Provisional Application No. 60/356,112, filed Feb. 14, 2002, which is hereby incorporated by reference.

FIELD OF THE INVENTION

The present invention relates generally to void-maintaining laminates having desirable characteristics of high permittivity and high transmissivity. Laminates of the present invention comprise at least one sheet-like core element, typically comprising void spaces or channels and, bonded thereto, at least one layer of Fuzzy Woven Composite for use in Geotechnical Applications (FWCGA).

BACKGROUND OF INVENTION

Water is the principal cause of distress in many types of structures. Geotechnical engineers and others skilled in the art specify and purchase sand, stone, or gravel as drainage means for conveying fluids to collection pipes. For some years, geocomposite materials have been used to complement natural earthen materials. Typically, such geocomposites are manufactured with a rigid core element encased between permeable non-woven fabrics that are thermally bonded to the rigid core element, or woven fabrics that are adhesively bound to the core element.

In conventional drainage laminates, membranes or woven textiles are typically adhered to a core element, the core element having voids or channels which permit the flow of fluids in a desired direction, typically away from the structure. However, the adhesions between the core element and the membrane or textile often fail in conventional laminates, resulting in intrusion of the membrane or textile into void spaces and the consequent clogging of those voids. With sufficient intrusion into the voids, clogging of the voids occurs, and insufficient drainage is provided to the structure with which the conventional laminate is associated. Such insufficiency often leads to failure of the structure or to a significant reduction in the length of its useful life.

Similar clogging problems exist with respect to the use of laminates formed of a core element and a non-woven geotextile. Typically, non-woven textiles resemble sheet-like pads of random fibers. Because of this, they have numerous potential fibrous attachment sites that are available for adhering or bonding the non-woven textile to a core element. However, because the pore size of non-woven geotextiles is not uniform, and because their random fibers tend to trap various sizes of particles, laminates which utilize them often clog quickly. With the use of semi-permeable or impermeable membranes, however, other problems exist. Because such semi-permeable or impermeable membranes are usually quite smooth, they are difficult to bond to core elements whether such bonding is effected by adhesives, heat fusion, laser welding or by ultrasonic bonding techniques. As a consequence of this, the adhesion between a membrane and its adjacent core element often fail in use.

The problems with the existing synthetic drainage technologies are therefore numerous. This is so because many synthetic drainage technology applications do not provide laminates that yield acceptable performance characteristics while retaining a reasonable amount of bond or adhesion between layers of the geocomposite. For example, even though leachate collection systems are more suitable for woven geofabric laminates, the geocomposite structures that use woven fabrics are limited in their use to those installations that allow for chemical adhesives to produce the bond between the core element and the fabric. These adhesives are typically soluble or degradable, and therefore fail to retain acceptable bonding characteristics over time. A related problem pertains to the fact that the bond strength of chemical adhesion is less than bonds provided by thermal methods such as heat fusion or laser welding.

Moreover, many specifiers are reluctant to introduce additional chemical constituents, such as are found in adhesives, into environmental applications. Moreover, conventional woven products cannot be thermally bonded to a degree that is acceptably effective for the areas or milieu of intended use. These disadvantages exist, at least partially, because woven fabrics are produced with a paucity of effective adhesion or bonding sites, that is, few fibers or protrusions that extend from the surface of the weave. This means that few fibers are available for inter-laminar bonding such as would otherwise take place during lamination or co-extrusion with the molten form of a rigid core element or layer.

Similar problems exist with respect to non-woven geofabrics. In sum, no woven or non-woven geoproducts are currently produced that yield acceptable bonding or adhesion performance characteristics with respect to thermal lamination methods such as heat fusion, laser welding or ultrasonic welding. Because of the above-described problems, there is thus a need for geocomposite laminates having superior structural integrity with respect to the maintenance of void spaces over time. More specifically, there is a need for geocomposites having superior bond strength between the respective layers of the laminates.

SUMMARY OF THE INVENTION

It is therefore an object of the invention to provide geocomposite laminates wherein the respective layers are adhered to one another at least partially by means of bonding elements.

It is a further object of the invention to provide geocomposite laminates having superior characteristics with respect to functional longevity, performance and inter-layer adhesion.

It is another object of the invention to provide methods for producing such superior geocomposite laminates.

In accordance with these and other objects, the present invention provides geocomposite laminates comprising A) at least one fuzzy layer, the fuzzy layer comprising at least one bonding surface having bonding elements, and a second surface disposed opposite the bonding surface, and B) at least one core element layer, the core element layer comprising at least one bonding surface, and a core element second surface disposed opposite the bonding surface, wherein the fuzzy layer bonding surface, and the core element layer bonding surface are bonded to one another to form the laminate. In such laminates, the fuzzy layer can be woven or may comprise a semi-permeable or an impermeable membrane.

Typically, a woven fuzzy layer comprises strands or fibers that form interstitial apertures of desired dimensions. Woven layers can be constructed and arranged so that such apertures are in a desired range or sieve size depending upon the specific intended use of the laminate. Although woven layers can be provided having any aperture or sieve size, they are typically in the range of from 0.05-3.0 millimeter (mm). In embodiments where a first fuzzy layer is provided on the first (typically the top) surface of the core structure and a second fuzzy layer is provided on the second (typically the bottom)

surface of the core structure, the interstice size of the two fuzzy layers may be the same or different.

For example, a specific embodiment of a laminate according to the invention might call for a fuzzy woven layer having an interstitial aperture size of 0.1 mm bonded to the first (top) surface of the core layer of and a fuzzy woven layer having an interstitial aperture size of 0.9 mm bonded to the second (bottom) surface of the core layer. As one of skill in the geocomposite arts can appreciate, a myriad of permutations of the present invention are possible depending upon the exact structures and specifications of the several layers chosen. The fuzzy layer may also be provided as a semi-permeable or impermeable membrane.

One key aspect of a fuzzy layer according to the invention is that it contains bonding elements on at least one of its first and second surfaces. Bonding elements are any structures extending from the surface of a geomembrane, geonet or geotextile layer that aid in the bonding of two or more layers to one another. Bonding elements include, for example, fibers, peduncles, filaments, threads, projections, protrusions, the ends of discontinuous threads or strands of a woven textile or such elements that have been formed on at least one surface of a semi-permeable or impermeable membrane.

The presence of bonding elements permits one or more layers to be attached to one another more securely than in the absence of bonding elements. An additional advantage of geotextiles and membranes comprising bonding elements is that they can be utilized by means known in the geocomposite field for attaching one or more layers to one another. Typically in the present invention, the fuzzy layer bonding surface, or one of two fuzzy layer bonding surfaces, is bonded to the core element layer bonding surface by means, for example, of heat fusion, ultrasound or laser welding. Indeed, the heat fusion of two layers can be effected by using the melt heat of extrusion of the core element during the extrusion of the core element layer to fuse the respective bonding elements, and thus the two layers, together. More than one of these methods can be used where desired or applicable.

In accordance with yet other objects of the invention, the fuzzy layer can be an impermeable or semi-permeable geomembrane, so long as it comprises bonding elements. In order to provide for even more effective bonding between layers, the core element itself may be formed to comprise a plurality of bonding areas for bonding with the bonding elements of the one or more fuzzy layers. For example, the top surfaces of core element peduncles or strands that form the core element outer surface may be sized to afford a larger surface available for bonding to an adjacent layer. An additional advantageous aspect of the present invention relates to providing the core element bonding areas with bonding elements similar to those provided on one or both surfaces of the fuzzy layers, such bonding elements comprising one or more from the group consisting of fibers, filaments, peduncles, threads, projections, protrusions, the ends of discontinuous threads or strands of a woven textile.

The present invention is adaptable for use with any of a myriad of types of core elements including random structure, monoplanar, biplanar, triplanar and quadra-layer geonets and geocomposites. Preferably, the core element layer and the fuzzy layer comprise one or more thermoplastic polymers, such as polyethylenes, polyesters, ABS, polybutylenes, polypropylenes, polybutadienes, styrene butadiene rubbers, and compounds derived from recycled tires.

The present invention includes multi-layer laminates of from 1 to 6 or more layers that are constructed and arranged to make the most effective use of their respective engineering specifications. Embodiments of the present invention include, for example, one or more additional layers attached to the second surface of the core element. The additional layer may comprise bonding elements in order to provide for greater cohesion between adjacent layers. The respective layers of the invention can be of many types. For example, the one or more additional layers or one or more fuzzy layers may be permeable or impermeable to fluids.

In accordance with still additional advantages and objects, the present invention provides methods for manufacturing void-maintaining geocomposites, comprising the steps of i) providing at least one fuzzy layer, the fuzzy layer comprising at least one bonding surface having bonding elements, and a second surface disposed opposite the bonding surface, ii) providing at least one core element layer, the core element layer comprising at least one bonding surface, and a core element second surface disposed opposite the bonding surface, and iii) bonding the fuzzy layer bonding surface, and the core element layer bonding surface to one another to form a laminate.

Bonding may be effected by any means that results in the desired degree of adhesion, including one or more of heat fusion, ultrasound and laser welding. One type of heat fusion can be effected by using the melt heat of extrusion of the core element present during the extrusion of the core element layer to melt-fuse the bonding elements and portions of the core layer to one another and thus fuse the two layers together.

The one or more fuzzy layers are preferably woven in such a manner that they contain the desired density of bonding elements, such as discontinuous threads, fibers or strands. Of course, woven fuzzy layers are particularly suitable for yielding apertures of desired or specified dimension. For example, woven layers can be constructed and arranged so that such apertures are in a desired range or sieve size depending upon the specific intended use of the laminate. Although woven layers can be provided having any aperture or sieve size, preferably they are typically in the range of from 0.01 to 5.0 millimeter (mm) and more preferably in the range of from 0.05 to 3.0 mm. Semi-permeable membrane layers may also be provided in forms having desired aperture sizes.

In the methods and laminates of the present invention, one or more layers may comprise bonding elements and one or more surfaces of each of those layers may comprise bonding elements. Thus, numerous combinations of the present methods and laminates are possible. Within the scope of the present invention, bonding elements are any structures extending from the surface of a geomembrane, geonet or geotextile layer that aid in the bonding of two or more layers to one another. Bonding elements include, for example, fibers, peduncles, filaments, threads, projections, protrusions, or the ends of discontinuous threads or strands of a woven textile, or similar elements extending from the surface of an impermeable or semi-permeable membrane.

Numerous types of core elements are suitable for practicing the present methods, and particularly those such as random structure, monoplanar, biplanar, triplanar and quadra-layer geonets and geocomposites. Similarly, numerous types of fuzzy layers are suitable for practicing the present methods. Either or both of the core element layer and the fuzzy layer may comprise one or more thermoplastic polymers including polyethylenes, polyesters, ABS, polybutylenes, polypropylenes, polybutadienes, styrene butadiene rubber, and compounds derived from recycled tires.

DETAILED DESCRIPTION OF THE PREFERRED EMBODIMENTS

The present invention utilizes a hybrid technology to provide geotextiles fabrics and membranes that yield the advantageous bonding characteristics of a non-woven geotextile with the advantageous filtration characteristics of a woven fabric. Fuzzy woven and fuzzy membrane geocomposites of the present invention exhibit superior strength with respect to the bonding of the two or more layers of numerous permutations of such geocomposites. Because of this, fuzzy geocomposites of the present invention can be used, for example, to more effectively replace or complement sand, stone, or gravel underneath pavement structures, or used in landfills or in other types of geotechnical applications.

Thus, the present invention overcomes the disadvantages of low inter-laminar adhesion or low bond strength by providing a synthetic drainage system or impermeable barrier that includes the heretofore unknown hybrid combination of advantages of both woven and non-woven fabric technology. The fabric itself is preferably manufactured with specified or defined permeability and permittivity properties in order to adapt or integrate it into a drainage system or an impermeable barrier that has effective useful life. In general, laminates of the present invention comprise at least one layer of fuzzy woven geotextile or geofabric, or a layer of fuzzy impermeable membrane or fizzy semi-permeable membrane. This fuzzy layer is thermally, adhesively, or ultrasonically bonded to a polymeric core element.

Preferred embodiments of the invention provide high transmissivity of subsurface fluids that enter the structure while maintaining desirable permeability characteristics on both sides of the core element. A high-permittivity core element, such as the geonet shown in U.S. Pat. No. 5,891,549 to Beretta et al., is exemplary of geonets suitable for use with fuzzy layers of the present invention. Numerous other geonets and void-maintaining layers are also suitable for use in the invention.

Fuzzy woven synthetic membranes and textiles can be found in the field of household and commercial carpet manufacturing and are available typically in the form of woven textiles which are sometimes known as "capped textiles." Fuzzy textiles for use in the present invention can be manufactured by using methods know in the arts pertaining to carpet manufacturing.

Advantageously, the void-maintaining laminates of the present invention can be positioned to maximize their effectiveness. For example, fuzzy laminates can be positioned to reside below a surface and in a manner that allows fluids to be directed to a pipe or other collection device in a manner that maximizes drainage efficiency as desired. The present invention includes the positioning of the laminates and drain means in many permutations depending on the particular needs of the structure to be drained. For example, laminates of the invention can be positioned below or adjacent to a building or large structure, above an aggregate layer, or above the ground water table, if desired. Moreover, the present laminates and methods include combinations wherein the laminate is positioned below a building or large structure in portions, which portions are connected to one another such that the interconnecting voids are of sufficient dimension that the water from the building can move freely through the connecting portions and thereby through the laminate. The present laminates and methods comprehend embodiments that include further drain means such as ditches or culverts adjacent a margin of a building or other large structure to be drained.

As a further advantage, the combinations and methods of the invention include wherein the building or structure base course comprises materials which have been excavated from the sub grade of the building site and wherein the building base course comprises materials which have been excavated from the sub grade of the building and mixed with imported materials.

A significant advantage of laminates of the present invention pertains to their ability to maintain voids to a sufficient extent that desired rates of fluid flow are maintained. In conventional drainage laminates, membranes or textiles are typically adhered to a core element having voids or channels which permit the flow of fluids in a desired direction, typically away fro the structure. However, the adhesions between the core element and the membrane or textile often fail in conventional laminates, resulting in intrusion of the membrane or textile into void spaces and the consequent clogging of those voids. With sufficient clogging of the voids, insufficient drainage is provided to the structure with which the conventional laminate is associated. Such insufficiency often leads to failure of the structure or to a significant reduction in the length of its useful life.

In contrast with conventional geocomposite laminates, adhesion between the two or more layers of the present invention is significantly improved. This is particularly significant with respect to the increased effectiveness of bonds between the core element and a filtering, sieving or fluid-impermeable layer. With the present fuzzy geocomposites, clogging of the void spaces or channels is reduced, and the drainage performance of the laminate remains within desired parameters.

A key aspect of a fuzzy layer according to the invention is that it contains bonding elements on at least one of its first and second surfaces. Bonding elements are any structures extending from the surface of a geomembrane, geonet or geotextile layer that aid in the bonding of two or more layers to one another. Bonding elements include, for example, fibers, peduncles, filaments, threads, projections, protrusions, the ends of discontinuous threads, fibers or strands of a woven textile, or similar elements that exist or have been formed on at least one surface of a semi-permeable or impermeable membrane.

The presence of bonding elements permits one or more layers to be attached to one another more securely than in the absence of bonding elements. An additional advantage of geotextiles and membranes comprising the bonding elements of the invention is that such elements can be utilized by means known in the geocomposite field for attaching two or more layers to one another. Typically in the present invention, the fuzzy layer bonding surface, or one of two fuzzy layer bonding surfaces, is bonded to the core element layer bonding surface by means, for example, of heat fusion, ultrasound or laser welding. Indeed, the heat fusion of two layers can be effected by using the melt heat of extrusion of the core element during the extrusion of the core element layer to fuse the respective bonding elements, and thus the two layers, together. More than one of these methods can be used where desired or applicable.

In another aspect, a key feature of bonding elements according to the invention is that they generally project from the plane of the membrane or textile such that they are available for bonding with another layer or core element. Preferably, bonding elements of the invention are constructed and arranged to be of sizes appropriate for the adhesion system to be employed. For example, if heat fusion is to be used, then the density, size and shape of the bonding elements must be such that the heat applied by the fusion method chosen results in sufficient heating of the bonding elements that they adhere to, or become fused to the bonding areas or elements of the core element or other adjacent layer.

Typical Characteristics of a Fuzzy Woven Composite According to the Invention:

In one class of preferred embodiments, a Fuzzy Woven Composite for use in Geotechnical Applications (FWCGA) includes at least one layer of fuzzy woven geotextile or fabric that is bonded to a polymeric core element. Preferably, the core element is one that maintains voids. The core element and fuzzy layer are preferably bonded to one another by means of one or more of heat, including laser welding, one or more adhesives, and ultrasound. Such an FWCGA typically has the following characteristics:

1) Yields tensile strength of at least 250 lbs./ft in both machine and cross machine direction when tested in accordance with ASTM D 4595.
2) Maintains external thickness dimensions of not less than 0.20 nor more than 1.0 inches while being able to transmit fluid at a rate of from $1\times10^{-4}$ M$^2$/sec to $5\times10^{-2}$ M$^2$/sec when tested utilizing ASTM D 4716 under sustained load of not less than 721 kPa (500 Lbs./Ft$^2$) for a duration of not less than 100 hours at gradients that range from 0.02, 0.5 and 1.0 when the boundary conditions to which the product is exposed include steel plates as well as in a soil environment.
3) Resists structural catastrophic collapse under load by retaining 30% of its external dimensional thickness after 1,000 hours under sustained normal load of at least 500 psf.
4) Maintains AOS properties of 25 to 200 when the product is to be used as a drainage system with one or more fuzzy woven laminates used as a filtration medium.
5) Allows fluids to penetrate its fuzzy woven laminate material when the fuzzy woven laminate is being used as a filtration material by allowing vertical infiltration of fluids at a rate of not less than $1\times10^{-5}$ M$^2$/sec.
6) Allows reduced and impeded vertical migration of fluids by impeding the progression of fluids that may pass through the core at a rate of no more than $1\times10^{-6}$ M$^2$/sec.
7) Possesses a polymeric extruded, cuspate or formed core element that, as a separate component, obtains a transmissivity of at least $5\times10^{-4}$ M$^2$/sec.

Advantageously, the void-maintaining laminates and fluid-transmissible layers of the present invention can be made in large pieces for example, in pieces several meters wide and many meters long. For convenience and installation, however, the laminates of the present invention, or their components, can be installed in portions which are interconnected such that the interconnecting voids are of sufficient dimension that the water from areas around the building can move freely through the laminate and can be connected to drain means such as a ditch or culvert adjacent a margin of the building or the large structure or perforated piping.

Other advantages of the present invention are found in the disclosed methods which provide drainage systems for buildings or other large structures. For example, the present invention is particularly applicable for level or sloping installations near large buildings. Preferably, the void-maintaining laminate further comprises at least one fluid-transmissible layer, preferably a geotextile of high permittivity adjacent the lower surface of the laminate and drain means adjacent the laminate and communicating therewith such that the fluid can move from the surrounding soil or aggregate through the fluid-transmissible layer into the laminate core and thereby to the drain means, wherein the drain means is sloped downwardly from the laminate.

Although the present invention has been described in connection with specific forms and permutations, those skilled in the art will appreciate that various modifications and other than those discussed herein are within the scope and spirit of the invention. For example, equivalent elements may be substituted for those specified herein, certain features may be used independently of other features, and process steps may be modified, reversed or interposed, all without departing from the invention as recited in the following claims.

What is claimed is:

1. A geocomposite laminate, comprising:
    A. at least one fiber-capped woven textile, said fiber-capped woven textile comprising
        I) at least one fiber-capped surface having bonding elements and
        II) a second surface disposed opposite said fiber-capped surface and comprising a woven fabric layer, wherein at least some fibers from said fiber-capped surface are needled through the thickness of the woven fabric layer; and
    B. at least one core element layer, said core element layer comprising
        III) at least one bonding surface, and
        IV) a core element second surface disposed opposite said bonding surface and comprising voids or channels which permit the flow of fluids in a desired direction,
        wherein said fiber-capped surface and said core element layer bonding surface are bonded to one another to form said laminate.

2. The laminate of claim 1, wherein said fiber-capped woven textile comprises strands or fibers that form interstitial apertures of desired dimensions.

3. The laminate of claim 2, wherein said interstitial apertures are in the range of from 0.05-3.0 mm.

4. The laminate of claim 1, wherein said fiber-capped woven textile second surface comprises additional bonding elements.

5. The laminate of claim 1, wherein said bonding elements comprise one or more from the group consisting of fibers, peduncles, filaments, threads, projections, protrusions, the ends of discontinuous threads, fibers or strands of a woven textile.

6. The laminate of claim 1, wherein said fiber-capped surface and said core element layer bonding surface are bonded to one another by means of one or more of heat fusion, ultrasound and laser welding.

7. The laminate of claim 6, wherein said heat fusion is effected using the melt heat of extrusion of said core element layer during the extrusion of said core element layer.

8. The laminate of claim 1, wherein said core element layer comprises a plurality of bonding areas.

9. The laminate of claim 8, wherein said core element bonding areas comprise additional bonding elements.

10. The laminate of claim 9, wherein said additional bonding elements comprise one or more from the group consisting of fibers, filaments, peduncles, threads, projections, protrusions, the ends of discontinuous threads, fibers or strands of a woven textile.

11. The laminate of claim 1, wherein said core element layer is one selected from the group consisting of random structure, monoplanar, biplanar, triplanar and quadra-layer geocomposites.

12. The laminate of claim 1, wherein said core element layer and said fiber-capped woven textile comprise one or more thermoplastic polymers.

13. The laminate of claim 12, wherein said thermoplastic polymers are chosen from the group consisting of polyethylenes, polyesters, ABS, polybutylenes, polypropylenes, polybutadienes, styrene butadiene rubbers, and compounds derived from recycled tires.

14. The laminate of claim 1, further comprising C. an additional layer attached to said second surface of said core element layer.

15. The laminate of claim 4, further comprising D. an additional layer attached to said second surface of said core element layer, wherein said additional layer comprises bonding elements.

16. The laminate of claim 1, wherein said fiber-capped woven textile is impermeable to fluids.

17. The laminate of claim 14, wherein said additional layer is impermeable to fluids.

18. The laminate of claim 14, comprising at least two additional layers.

19. The laminate of claim 1, wherein said fiber-capped woven textile and core element layer, combined, have a tensile strength of at least 250 lbs./ft in both machine and cross machine directions when tested in accordance with ASTM D 4595.

20. The laminate of claim 1, wherein said fiber-capped woven textile and core element layer, combined, retain at least 30% of their external dimensional thickness after 1,000 hours under a sustained normal load of at least 500 psf.

21. The laminate of claim 1, wherein said fiber-capped woven textile and core element layer, combined, maintain AOS properties in the range of 25-200 when used as a filtration medium in a drainage system, wherein said drainage system comprises one or more fuzzy woven laminates.

22. The laminate of claim 1, wherein said fiber-capped woven textile and core element layer, combined, maintain external thickness dimensions of not less than 0.20 nor more than 1.0 inches while being able to transmit fluid at a rate of from $1\times10^{-4}$ $M^2$/sec to $5\times10^{-2}$ $M^2$/sec when tested utilizing ASTM D 4716 under a sustained load of not less than 721 kPa (15000 Lbs./Ft$^2$) for a duration of not less than 100 hours at gradients in the range of from 0.02 to 1.0 when the boundary conditions to which the product is exposed comprise steel plates.

23. The laminate of claim 1, wherein said fiber-capped woven textile and core element layer, combined, maintain external thickness dimensions of not less than 0.20 nor more than 1.0 inches while being able to transmit fluid at a rate of from $1\times10^{-4}$ $M^2$/sec to $5\times10^{-2}$ $M^2$/sec when tested utilizing ASTM D 4716 under a sustained load of not less than 721 kPa (15000 Lbs./Ft$^2$) for a duration of not less than 100 hours at gradients in the range of from 0.02 to 1.0 in a soil environment.

24. The laminate of claim 1, wherein said fiber-capped woven textile and core element layer, combined, permit vertical infiltration of fluids at a rate of not less than $1\times10^{-5}$ $M^2$/sec, when used as a filtration material.

25. The laminate of claim 1, wherein said fiber-capped woven textile and core element layer, combined, restrict the vertical migration of fluids by impeding the progression of fluids that may pass through the core at a rate of no more than $1\times10^{-6}$ $M^2$/sec.

26. A method for manufacturing geocomposites, comprising the steps of
   i) providing at least one fiber-capped woven textile, said fiber-capped woven textile comprising
      I) at least one fiber-capped surface having bonding elements and
      II) a second surface disposed opposite said fiber-capped surface and comprising a woven fabric layer, wherein at least some fibers from said fiber-capped surface are needled through the thickness of the woven fabric layer;
   ii) providing at least one core element layer, said core element layer comprising
      III) at least one bonding surface, and
      IV) a core element second surface disposed opposite said bonding surface and comprising voids or channels which permit the flow of fluids in a desired direction; and
   iii) bonding said fiber-capped surface and said core element layer bonding surface to one another to form said laminate.

27. The method of claim 26, wherein said bonding is effected by means of one or more of heat fusion, ultrasound and laser welding.

28. The method of claim 27, wherein said heat fusion is effected using the melt heat of extrusion of said core element layer during the extrusion of said core element layer.

29. The method of claim 26, wherein said fiber-capped woven textile comprises strands or fibers that form interstitial apertures of desired dimensions.

30. The method of claim 29, wherein said interstitial apertures are in the range of from 0.1-3.0 mm.

31. The method of claim 26, wherein said fiber-capped woven textile second surface comprises additional bonding elements.

32. The method of claim 31, wherein said additional bonding elements comprise one or more from the group consisting of fibers, peduncles, filaments, threads, projections, protrusions, the ends of discontinuous threads or strands of a woven textile.

33. The method of claim 26, wherein said core element layer is one selected from the group consisting of monoplanar, biplanar, triplanar and quadra-layer geocomposites.

34. The method of claim 26, wherein said core element layer and said fiber-capped woven textile comprise one or more thermoplastic polymers.

35. The method of claim 34, wherein said thermoplastic polymers are chosen from the group consisting of polyethylene, ABS, polybutylene, polypropylene, polybutadiene, and recycled tire compounds.

\* \* \* \* \*